US012546466B2

(12) United States Patent
Jiang et al.

(10) Patent No.: US 12,546,466 B2
(45) Date of Patent: Feb. 10, 2026

(54) STAGE LIGHT FIXTURE WITH WATERPROOF SUPPORT

(71) Applicant: Guangzhou Haoyang Electronic Co., Ltd., Guangzhou (CN)

(72) Inventors: Weikai Jiang, Guangzhou (CN); Weiquan Jiang, Guangzhou (CN); Xing Tian, Guangzhou (CN); Zhiqiang Chen, Guangzhou (CN)

(73) Assignee: Guangzhou Haoyang Electronic Co., Ltd., Guangzhou (CN)

( * ) Notice: Subject to any disclaimer, the term of this patent is extended or adjusted under 35 U.S.C. 154(b) by 0 days.

(21) Appl. No.: 18/817,957

(22) Filed: Aug. 28, 2024

(65) Prior Publication Data

US 2025/0369605 A1 Dec. 4, 2025

(30) Foreign Application Priority Data

May 31, 2024 (CN) ........................ 202421241632.2

(51) Int. Cl.
*F21V 31/00* (2006.01)
*F21V 21/15* (2006.01)
*F21W 131/406* (2006.01)

(52) U.S. Cl.
CPC ............ *F21V 31/005* (2013.01); *F21V 21/15* (2013.01); *F21W 2131/406* (2013.01)

(58) Field of Classification Search
CPC .. F21V 31/005; F21V 21/15; F21W 2131/406
See application file for complete search history.

(56) References Cited

U.S. PATENT DOCUMENTS 7,789,525 B2 * 9/2010 Vinther ................... F21V 23/02 362/426
9,732,950 B2 * 8/2017 Dalsgaard ............... F21V 21/06
2008/0062692 A1 * 3/2008 Andersen .................. F21V 7/22 362/275
2011/0199770 A1 * 8/2011 Pedersen ................. F21V 21/30 362/249.03

(Continued)

FOREIGN PATENT DOCUMENTS

CN 104566035 A 4/2015
CN 208859549 U 5/2019

(Continued)

*Primary Examiner* — Tsion Tumebo
(74) *Attorney, Agent, or Firm* — MUNCY, GEISSLER, OLDS & LOWE, P.C.

(57) ABSTRACT

A stage light fixture has a support, a bottom case, a light head rotatable relative to the support or the bottom case with driving of a motor. The support includes a support base pivoted to the bottom case, a base sealing cavity being formed in the support base, and two support arms respectively pivoted to two opposite sides of the light head, two arm sealing cavities being respectively formed in the two support arms. The base sealing cavity is in communication with at least one of the two arm sealing cavities in the two support arms, the support base is in sealed connection with the two support arms at points where the base sealing cavity is in communication with the two arm sealing cavities, and the motor is positioned in the base sealing cavity or at least one of the two arm sealing cavities.

13 Claims, 9 Drawing Sheets

(56) References Cited

U.S. PATENT DOCUMENTS

| | | | | |
|---|---|---|---|---|
| 2011/0235330 | A1* | 9/2011 | Pedersen | F21V 29/77<br>165/47 |
| 2021/0396376 | A1* | 12/2021 | Jiang | F21V 21/30 |
| 2021/0396377 | A1* | 12/2021 | Jiang | F21V 21/30 |

FOREIGN PATENT DOCUMENTS

| | | | |
|---|---|---|---|
| CN | 210424939 | U | 4/2020 |
| CN | 221004936 | U | 5/2024 |
| WO | WO2024061447 | A1 | 3/2024 |

* cited by examiner

STAGE LIGHT FIXTURE WITH WATERPROOF SUPPORT

CROSS REFERENCE TO RELATED APPLICATIONS

The present application claims priority from Chinese Application No. CN 202421241632.2 filed on May 31, 2024, all of which are hereby incorporated herein by reference.

TECHNICAL FIELD

The present invention relates to the technical field of stage light fixtures, and more particularly, relates to a stage light fixture with a waterproof support.

BACKGROUND

As important equipment for stage performances, stage light fixtures are capable of producing colorful lighting effects and rendering stage effects for various performance programs on stage. The conventional stage light fixture generally includes a light head with an internal light source, a light effect module, and a focusing module therein, as well as a bottom case for installing a power supply and a control module. A support is also connected to the bottom case and pivoted to the light head at the two opposite sides thereof to make the light head swing or rotating in multiple directions, thereby achieving different projection angles of the stage light fixture to produce more lighting effects.

The support of conventional stage lights is mostly formed by simple splicing several pieces, without fully taking waterproof and sealing issues of the support into consideration. Therefore, the existing supports are mostly non-waterproof or only locally waterproof. Dut to poor waterproof performance of the support, ordinary motor, especially non-waterproof motor, for driving the light head to rotate is not installed in the support, but generally installed in the light head having higher waterproof level. In this situation, most of the transmission components associated with the motor are also arranged in the light head. As a result, large space in the light head is undoubtedly occupied by the motor and the transmission components thereof. On the contrary, if the motor is directly arranged in the support of the stage light fixture, extra waterproof designs are required in the support, which makes the support more complicated in structure. In order to address the issues, waterproof motor is used and arranged in the support of the stage light fixture. However, such way will significantly increase whole cost of the stage light fixture, due to the relatively expensive waterproof motor.

SUMMARY

It is therefore an object of the present invention to provide a stage light fixture with a waterproof support which is free from the aforesaid drawbacks of the prior art. The stage light fixture in the present invention has a support with improved waterproof performance, allowing non-waterproof motor to be arranged in the support.

The stage light fixture in the present invention includes a light head, a bottom case, and a support. The light head is rotatable relative to the support or the bottom case with driving of a motor. The support of the stage light fixture includes a support base pivoted to the bottom case and two support arms respectively pivoted to the two opposite sides of the light head. A base sealing cavity is formed in the support base and two arm sealing cavities are respectively formed in the two support arms, the base sealing cavity being in communication with at least one of the arm sealing cavities in the support arms. The support base is in sealed connection with the two support arms at the points where the base sealing cavity is in communication with the arm sealing cavities. The motor in the present invention is positioned in the base sealing cavity or the arm sealing cavities.

According to the present invention, the support is divided into a support base pivoted to the bottom case and two support arms respectively pivoted to the two opposite sides of the light head. A base sealing cavity and an arm sealing cavity in communication with each other are respectively formed in the support base and each support arm. In addition, the support base is in sealed connection with the support arm at the point where the base sealing cavity is in communication with the arm sealing cavity. With such configuration, good sealing performance for all the sealing cavities formed in the support is provided, so that in a case that the motor for driving the light head to rotate is arranged in the base sealing cavity or the arm sealing cavity, water or moisture outside can be prevented entering the support to damage the motor. Therefore, the support in the present invention has improved waterproof performance, allowing non-waterproof motor to be positioned therein.

Particularly, each support arm in the present invention may have an arm interface in communication with the corresponding arm sealing cavity, and the support base is provided with a base interface which is in communication with the base sealing cavity, the arm interface being abutted against the base interface. An interface sealing ring surrounding the arm interface and the base interface is sandwiched between the support base and the support arm, with two opposite sides of the interface sealing ring pressed between the support base and the support arm.

Furthermore, the support arm is integrally formed with an annular interface protrusion which surrounds the arm interface and protrudes along the center axis direction of the interface sealing ring. Correspondingly, the support base is integrally formed with an interface groove surrounding the base interface. The interface sealing ring is received in the interface groove, and the annular interface protrusion is inserted in the interface groove and pressed against the interface sealing ring.

Each support arm particularly includes an arm side plate and an arm cover according to the present invention, which are spliced together in a sealing way. The arm sealing cavity is formed in the spliced space between the arm side plate and the arm cover. The arm interface is provided in the arm side plate.

The arm cover and the arm side plate may be integrally formed with an annular arm cover protrusion surrounding the arm sealing cavity and a side plate groove, respectively. In this case, an arm sealing ring is received in the side plate groove, and the annular arm cover protrusion is inserted in the side plate groove and pressed against the arm sealing ring.

According to the present invention, the two opposite sides of each arm side plate may be respectively formed with a clamping groove and the opposite sides of the support base may be respectively formed with a clamping plate. In this case, each clamping plate is cooperatively inserted in the corresponding clamping groove at the opposite sides of the arm side plate to clamp the corresponding arm side plate.

The support base in the present invention particularly includes a base bottom plate and a base cover, which are spliced together in a sealing way to form the base sealing cavity in the spliced space therebetween.

In addition, the base bottom plate is further integrally formed with a reinforced frame protruding towards the top of the base cover. In this case, the base interface is provided in the reinforced frame. The upper end of the reinforced frame is spliced with the inner wall of the top of the base cover when the base bottom plate and the base cover are spliced together.

The base cover and the base bottom plate are integrally formed with an annular base cover protrusion and a bottom plate groove, respectively. In this case, the surrounding track of the bottom plate groove spans the top of the reinforced frame. A base sealing ring is received in the bottom plate groove, and the annular base cover protrusion is inserted in the bottom plate groove and pressed against the base sealing ring.

Additionally or alternatively, the inner wall of the top of the base cover is integrally formed with a locking connection plate extending along the direction perpendicular to the central axis of the interface sealing ring. The top of the reinforced frame is formed with a locking connection groove corresponding to the locking connection plate. The locking connection plate is inserted in the locking connection groove and cooperatively locked therein.

Preferably, the arm side plate in the present invention is a die-molded metal part, while the arm cover in the present invention is a plastic part.

Preferably, the base bottom plate in the present invention is a die-molded metal part, while the base cover in the present invention is a plastic part.

In order to facilitate cooperation of the elements in relative rotational connection and enhance structure strength of the rotational connection, the support in the present invention may further includes a rotation bushing in rotational connection with the light head and/or the bottom case.

The rotation bushing is preferably integrally formed with the support base and/or the support arm, especially integrally die-molded, as integrally die-molded processing can improve accuracy of the formed parts while with less molds.

Additional advantages, features and possible applications of the present invention will be apparent from the description which follows, in which reference is made to the embodiments illustrated in the drawings.

DESCRIPTION OF THE DRAWINGS

In order to describe technical solutions in the present disclosure more clearly, the accompanying drawings to be used in some embodiments of the present disclosure will be introduced briefly.

DETAILED DESCRIPTION

Figure 1:
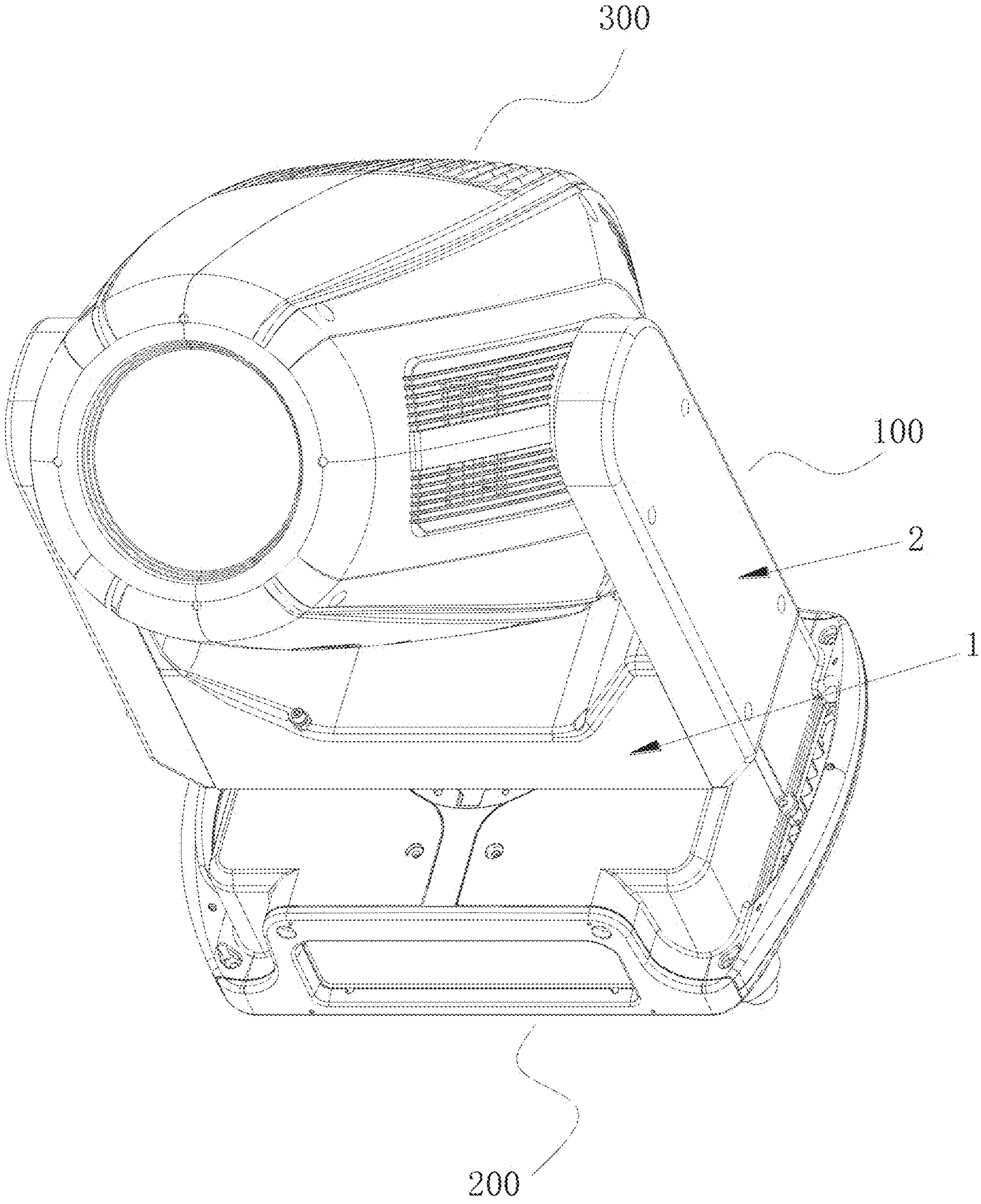
FIG. 1 is a perspective view of a stage light fixture according to an embodiment of the present invention.

The technical solutions in some embodiments of the present disclosure will be described clearly with reference to the accompanying drawings; obviously, the described embodiments are merely some but not all of embodiments of the present disclosure. All other embodiments obtained by a person of ordinary skill in the art based on embodiments of the present disclosure shall be included in the protection scope of the present disclosure.

The accompanying drawings are for exemplary illustration only, and should not be construed as limitations on this invention. In order to better illustrate the present embodiment, some parts of the accompanying drawings may be omitted, enlarged or reduced, and do not represent the size of actual products. For those skilled in the art, it is understandable that certain well-known structures and descriptions thereof may be omitted in the drawings. The positional relationship described in the drawings is only for exemplary illustration, and should not be construed as a limitation on this invention.

FIG. 1 provides a stage light fixture with a waterproof support according to an embodiment of the present invention. The stage light fixture includes a support 100, a bottom case 200, and a light head 300. By a respective motor 400, the light head 300 is rotatable about the support 100 and the support 100 is rotatable about the bottom case 200.

Figure 2:
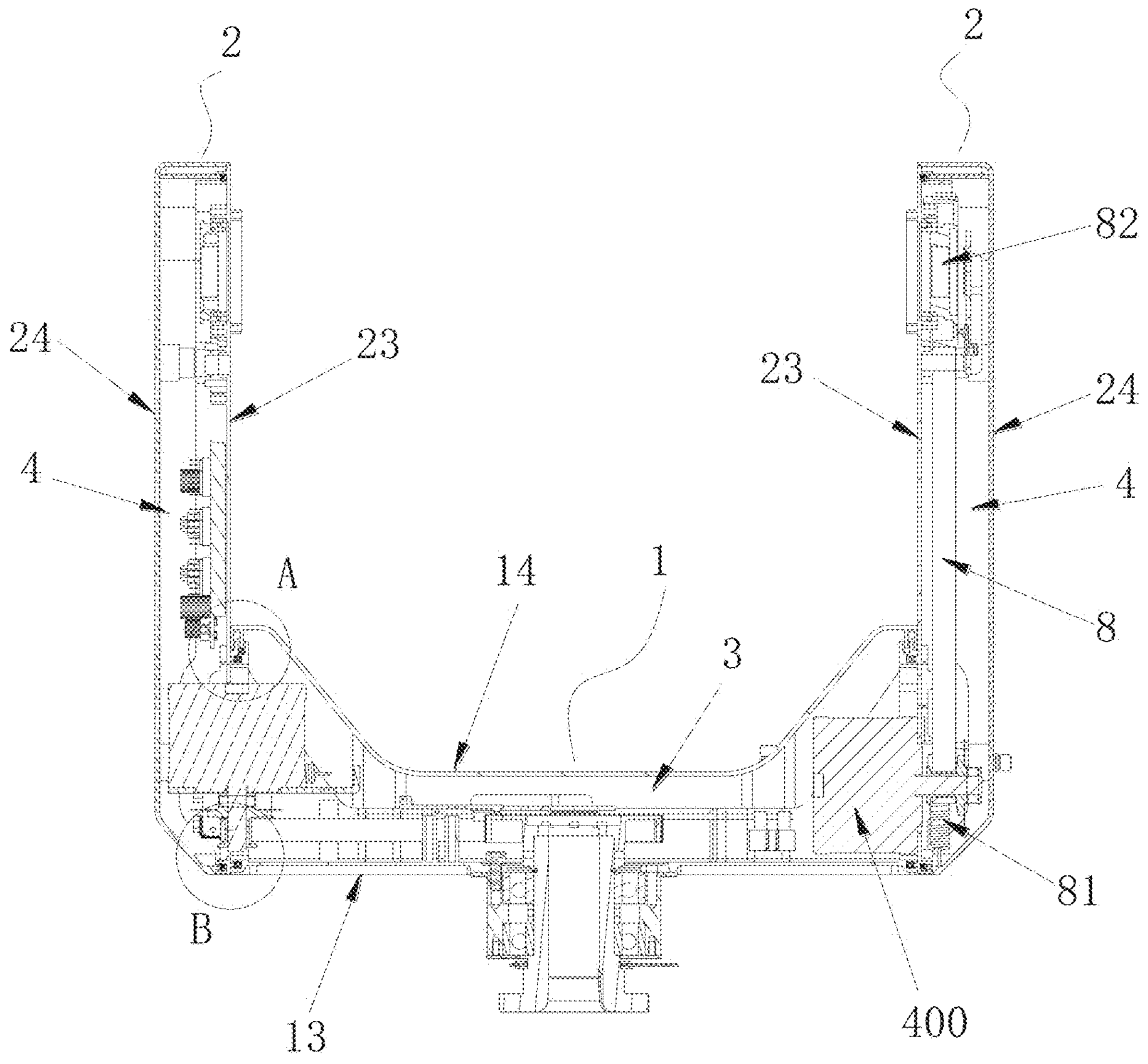
FIG. 2 is a sectional view of a support of the stage light fixture of FIG. 1.

Referring to FIG. 2, the support 100 includes a support base 1 and two support arms 2. The support base 1 is pivoted to the bottom case 200 and the two support arms 2 are respectively pivoted to the left and right sides of the light head 300. A base sealing cavity 3 is formed in the support base 1 and an arm sealing cavity 4 is formed in each support arm 2, with the base sealing cavity 3 in communication with at least one arm sealing cavity 4 in the support arms 2. In addition, the support base 1 is in sealed connection with the support arms 2 at the points where the base sealing cavity 3 is in communication with the arm sealing cavity 4 to ensure sealability between the cavities after communicated. The motor 400 may be mounted in the base sealing cavity 3 or the arm sealing cavity 4. In the present embodiment, the motor 400 is mounted in the base sealing cavity 3.

According to the present embodiment, the support 100 is divided into a support base 1 pivoted to the bottom case 200 and two support arm 2 respectively pivoted to the two opposite sides of the light head 300. A base sealing cavity 3 and an arm sealing cavity 4 in communication with each other are respectively formed in the support base 1 and each support arm 2. With the support base 1 in sealed connection with the support arms 2 at the point where the base sealing cavity 3 is in communication with the arm sealing cavity 4, it can ensure sealing performance for all the sealing cavities formed in the support, so that in a case that the motor 400 for driving the light head 300 to rotate is arranged in the base sealing cavity 3 or the arm sealing cavity 4, water or moisture outside can be prevented entering the support 100 to damage the motor 400. Therefore, the support 100 in the present embodiment has improved waterproof performance, non-waterproof motor thus is allowable to position therein.

It should be noted that communication between the support base 1 and the support arms 2 in the present embodiment may allow air communication therebetween, or may only allow cables or driving shaft of the motor 400 to pass therebetween, while air communication is not allowed.

In the present embodiment, the motor 400 for driving the light head 300 to rotate and the motor 400 for driving the support 100 to rotate are all arranged in the support base 1 and positioned at the connecting point of the support base 1 and each support arm 2. The base sealing cavity 3 and the arm sealing cavity 4 are in air communication in the present embodiment.

Figure 3:
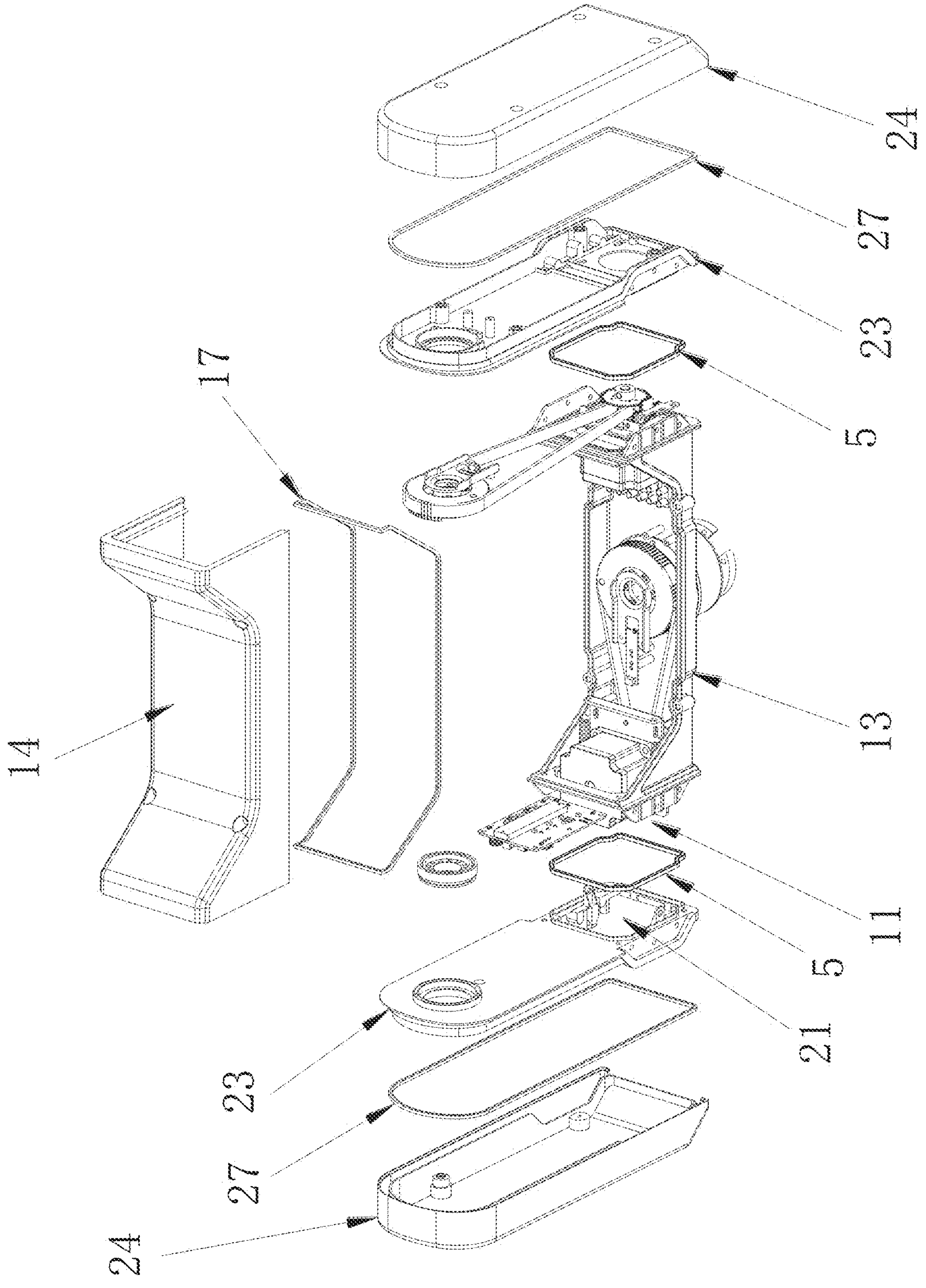
FIG. 3 is an exploded view of the support of the stage light fixture of FIG. 1.
Figure 4:
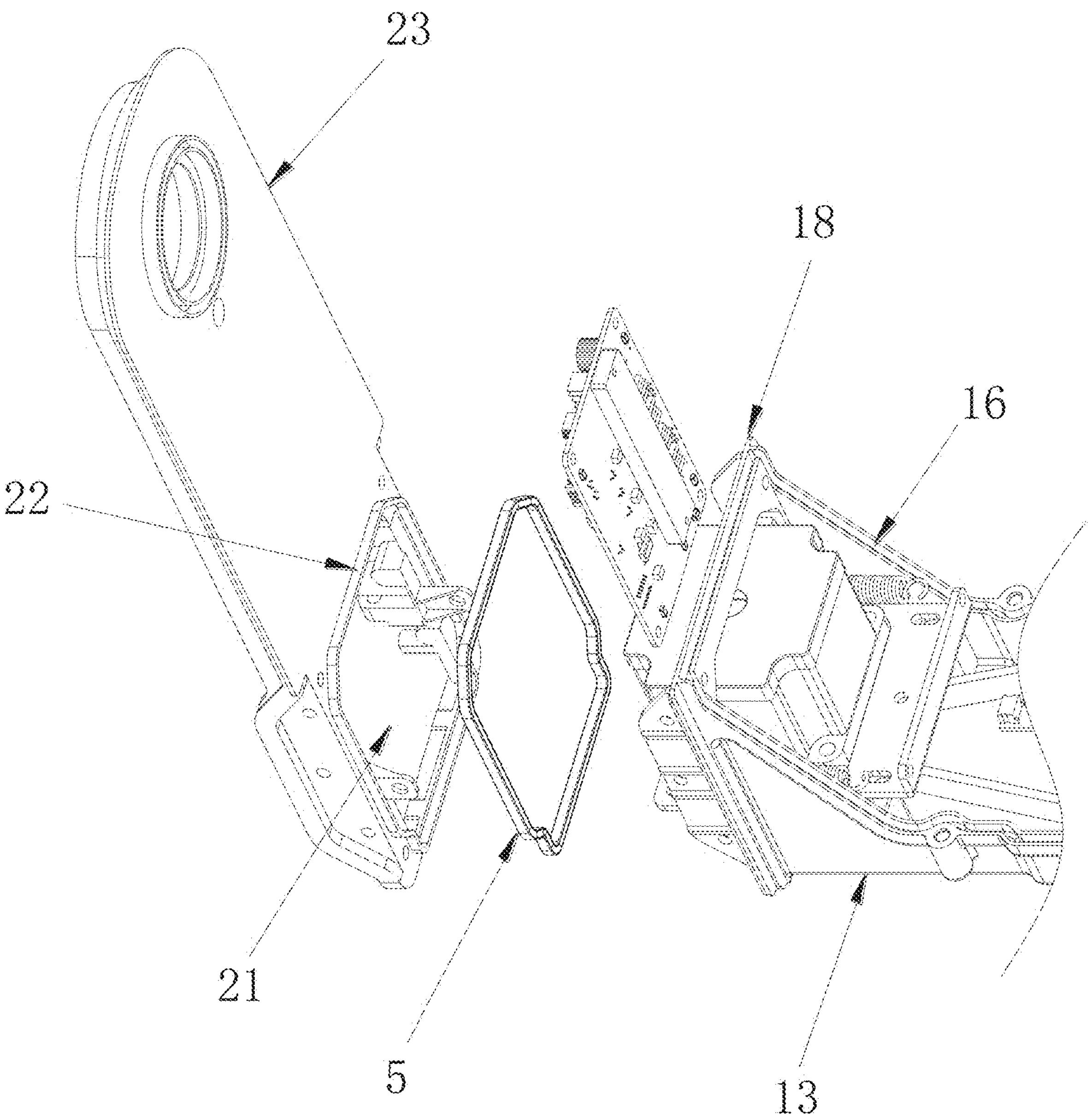
FIG. 4 is a partial view of a detail of FIG. 3.

Referring now to FIG. 3 and FIG. 4, an exploded view of the support 100 is shown. Each support arm 2 is provided with an arm interface 21, especially at the inner side of the support arm 2. The arm interface 21 is in communication with the corresponding arm sealing cavity 4 in the support arm 2. The left and right sides of the support base 1 are both provided with a base interface 11 which is in communication with the base sealing cavity 3 in the support base 1. The arm interface 21 is abutted against the base interface 11 in the present embodiment. An interface sealing ring 5 is sandwiched between the support base 1 and the support arm 2, which surrounds the arm interface 21 and the base interface 11, with two opposite sides of the interface sealing ring 5 pressed between the support base 1 and the support arm 2. When the support base 1 and the support arm 2 are connected to each other and pressed against the interface sealing ring 5, the interface sealing ring 5 seals the abutted gap between the arm interface 21 and the base interface 11, thereby effectively preventing water and moisture outside entering the base sealing cavity 3 and the arm sealing cavity 4.

As may best be seen from FIG. 4, the support arm 2 is integrally formed with an annular interface protrusion 22 which surrounds the arm interface 21 and protrudes along the center axis direction of the interface sealing ring 5. Correspondingly, the support base 1 is integrally formed with an interface groove 12 surrounding the base interface 11. In assembling, the interface sealing ring 5 is received in the interface groove 12, then the annular interface protrusion 22 is inserted the interface groove 12 and pressed against the interface sealing ring 5 (clearly shown in FIG. 6 and FIG. 7). Therefore, sealability between the support base 1 and the support arm 2 is effectively improved in an easy way.

Reference back to FIG. 3, the support arm 2 particularly includes an arm side plate 23 and an arm cover 24 according to an embodiment. The arm side plate 23 is a metal part, especially a die-molded metal part. The arm cover 24 is a plastic part. The arm side plate 23 and the arm cover 24 are spliced together in a sealing way and fastened by screws. The arm sealing cavity 4 is formed in the spliced space between the arm side plate 23 and the arm cover 24. The arm interface 21 is provided in the arm side plate 23, so that the support arm 2 is connected to the support base 1 via the arm side plate 23.

Figure 7:
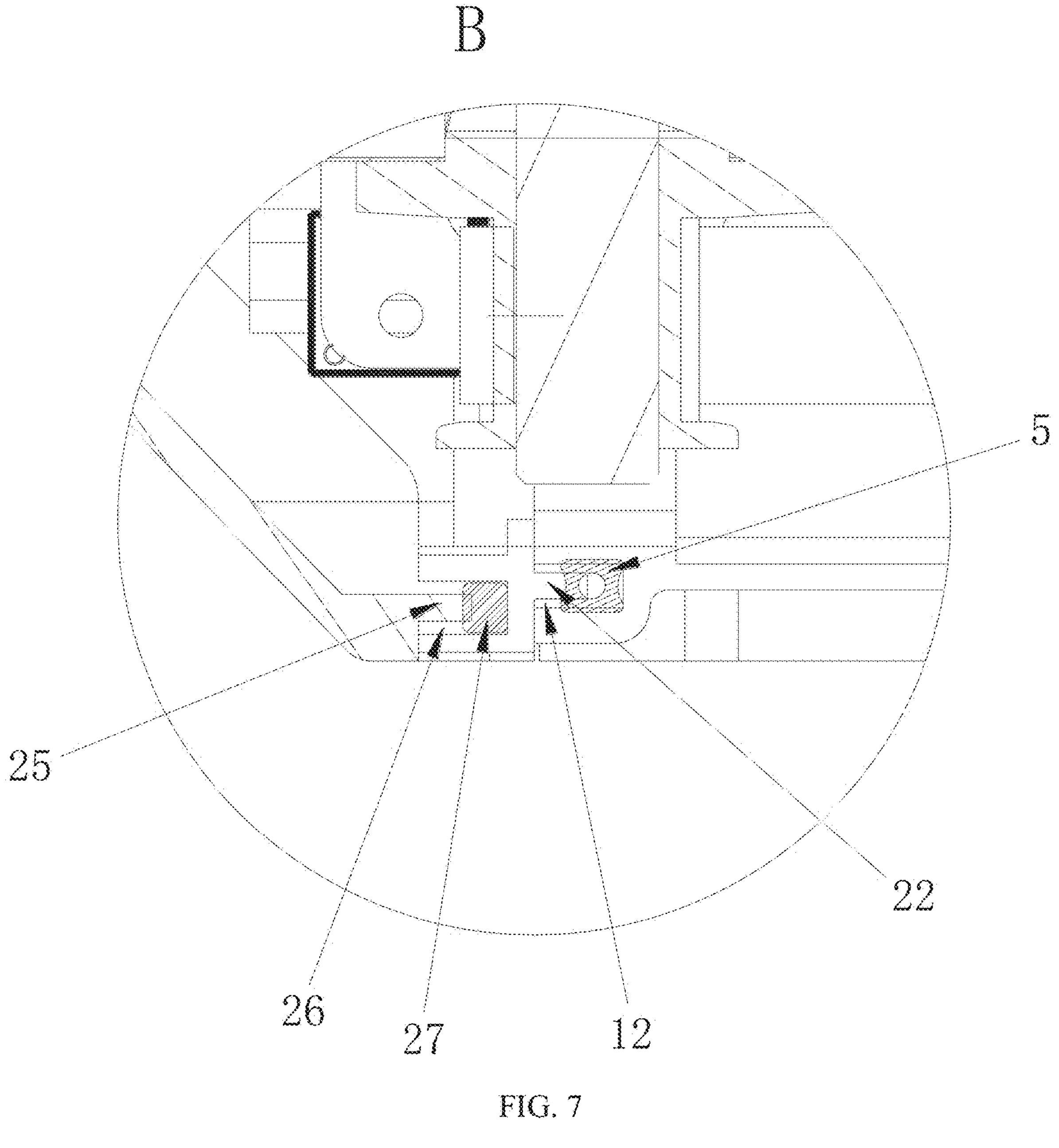
FIG. 7 is an enlarged view of part B in FIG. 2.

More particularly, in combination with FIG. 7, the arm cover 24 and the arm side plate 23 are integrally formed with an annular arm cover protrusion 25 surrounding the arm sealing cavity 4 and a side plate groove 26, respectively. In this embodiment, the annular arm cover protrusion 25 is integrally formed on the arm cover 24 and the side plate groove 26 is integrally formed on the arm side plate 23. An arm sealing ring 27 is received in the side plate groove 26. In assembling, the annular arm cover protrusion 25 is inserted the side plate groove 26 and pressed against the arm sealing ring 27. Therefore, sealability between the arm side plate 23 and the arm cover 24 is effectively improved in such easy way, thus ensuring sealing splicing between the arm side plate 23 and the arm cover 24 to prevent water and moisture outside entering the arm sealing cavity 4.

As shown in FIG. 3, the support base 1 particularly includes a base bottom plate 13 and a base cover 14 according to an embodiment. The base bottom plate 13 is a metal part, especially a die-molded metal part. The base cover 14 is a plastic part. The base bottom plate 13 and the base cover 14 are spliced together in a sealing way and fastened by screws to form the base sealing cavity 3 in the spliced space therebetween. Therefore, the base sealing cavity 3 is formed in the support base 1 in such a sealing way.

In combination with FIG. 4, the base bottom plate 13 is integrally formed with a reinforced frame 18 protruding towards the top of the base cover 14. The base interface 11 is provided in the reinforced frame 18. With the upper end of the reinforced frame 18 spliced with the inner wall of the top of the base cover 14 during splicing the base bottom plate 13 and the base cover 14, on the one hand whole structure strength of the base bottom plate 13 is enhanced, on the other hand a more stable inner structure of the support base 1 is formed by the base bottom plate 13 and the base cover 14 as the reinforced frame 18 supports the base cover 14 upwards in the base bottom plate 13.

Figure 6:
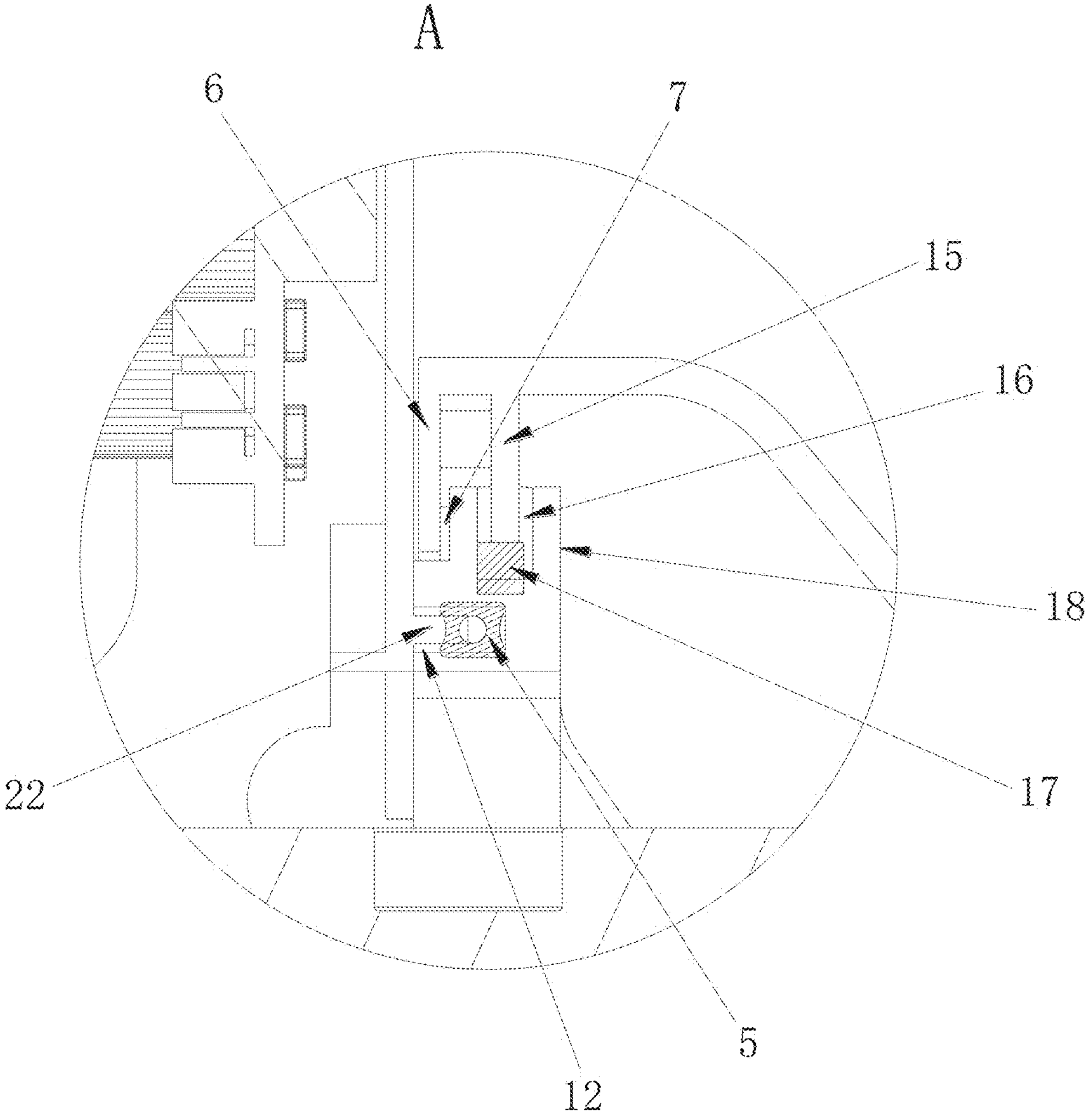
FIG. 6 is an enlarged view of part A in FIG. 2.

Further in combination with FIG. 6, the base cover 14 and the base bottom plate 13 are integrally formed with an annular base cover protrusion 15 and a bottom plate groove 16, respectively.

In this embodiment, the annular base cover protrusion 15 is integrally formed on the base cover 14 and the bottom plate groove 16 is integrally formed on the base bottom plate 13. In addition, the surrounding track of the bottom plate groove 16 spans the top of the reinforced frame 18. A base sealing ring 17 is received in the bottom plate groove 16. In assembling, the annular base cover protrusion 15 is inserted in the bottom plate groove 16 and pressed against the base sealing ring 17. Therefore, sealability between the base bottom plate 13 and the base cover 14 is effectively improved in such easy way, thus ensuring sealing splicing between the base bottom plate 13 and the base cover 14 to prevent water and moisture outside entering the base sealing cavity 3.

Additionally, as shown in FIG. 6, the inner wall of the top of the base cover 14 is especially integrally formed with a locking connection plate 6 extending along the direction perpendicular to the central axis of the interface sealing ring 5. The top of the reinforced frame 18 is formed with a locking connection groove 7 corresponding to the locking connection plate 6. The locking connection plate 6 is inserted in the locking connection groove 7 and cooperatively locked therein. As a result, the cooperative locking of the locking connection plate 6 and the locking connection groove 7 makes the connection between the support arm 2 and the support base 1 more stable.

It's noted that in the present embodiment, the annular interface protrusion 22 is integrally formed on the side of the arm side plate 23 and the interface groove 12 is integrally formed on side of the reinforced frame 18 of the base bottom plate 13. The locking connection plate 6 is inserted in the locking connection groove 7 along the direction perpendicular to the central axis of the interface sealing ring 5 and the annular interface protrusion 22 is inserted in the interface groove 12 along the direction of the central axis of the interface sealing ring 5, namely the inserting direction of the locking connection plate 6 relative to the locking connection groove 7 is perpendicular to the inserting direction of the annular interface protrusion 22 and the interface groove 12, which further improves structure stability of the whole support 100.

Figure 8:
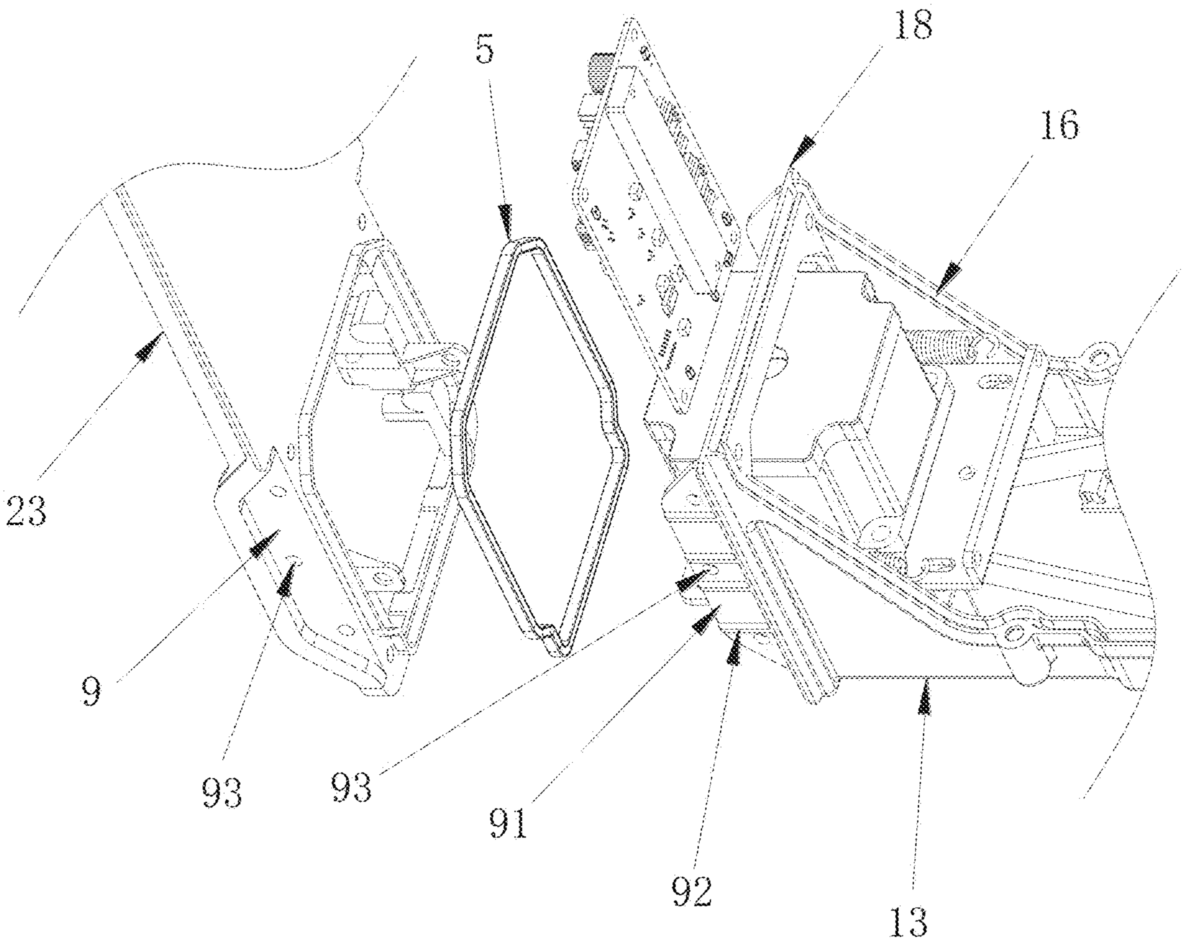
FIG. 8 is another partial view of a detail of FIG. 3.

Referring now to FIG. 8, the two opposite sides of each arm side plate 23 are respectively formed with a clamping groove 9 and the opposite sides of the support base 1 are respectively formed with a clamping plate 91. The clamping plate 91 is especially integrally formed on the reinforced frame 18 of the base bottom plate 13. With each clamping plate 91 cooperatively inserted in the corresponding clamping groove 9 at the opposite sides of the arm side plate 23, the arm side plate 23 thus is clamped. In this way, when the two clamping plates 91 respectively inserted in the in the corresponding clamping groove 9 at the opposite sides of the arm side plate 23, the arm side plate 23 is clamped between the two clamping plates 91 of the support base 1, thereby positioning the support arm 2 at the end of the support base 1 during assembling. In addition, the clamping plate 91 and the clamping groove 9 are respectively provided with multiple screw holes 93, which are coaxial with each other. The support arm 2 thus can be fastened to the support base 1 through screws cooperated with screw holes.

More preferably, multiple ribs 92 are formed on the outer side of the clamping plate 91. The ribs 92 are in interference fit between the clamping plate 91 and the inner wall of the arm cover 24, when the clamping plate 91 is inserted therebetween, which makes the connection between the support arm 2 and the support base 1 more stable, thereby avoiding wobbling.

Figure 5:
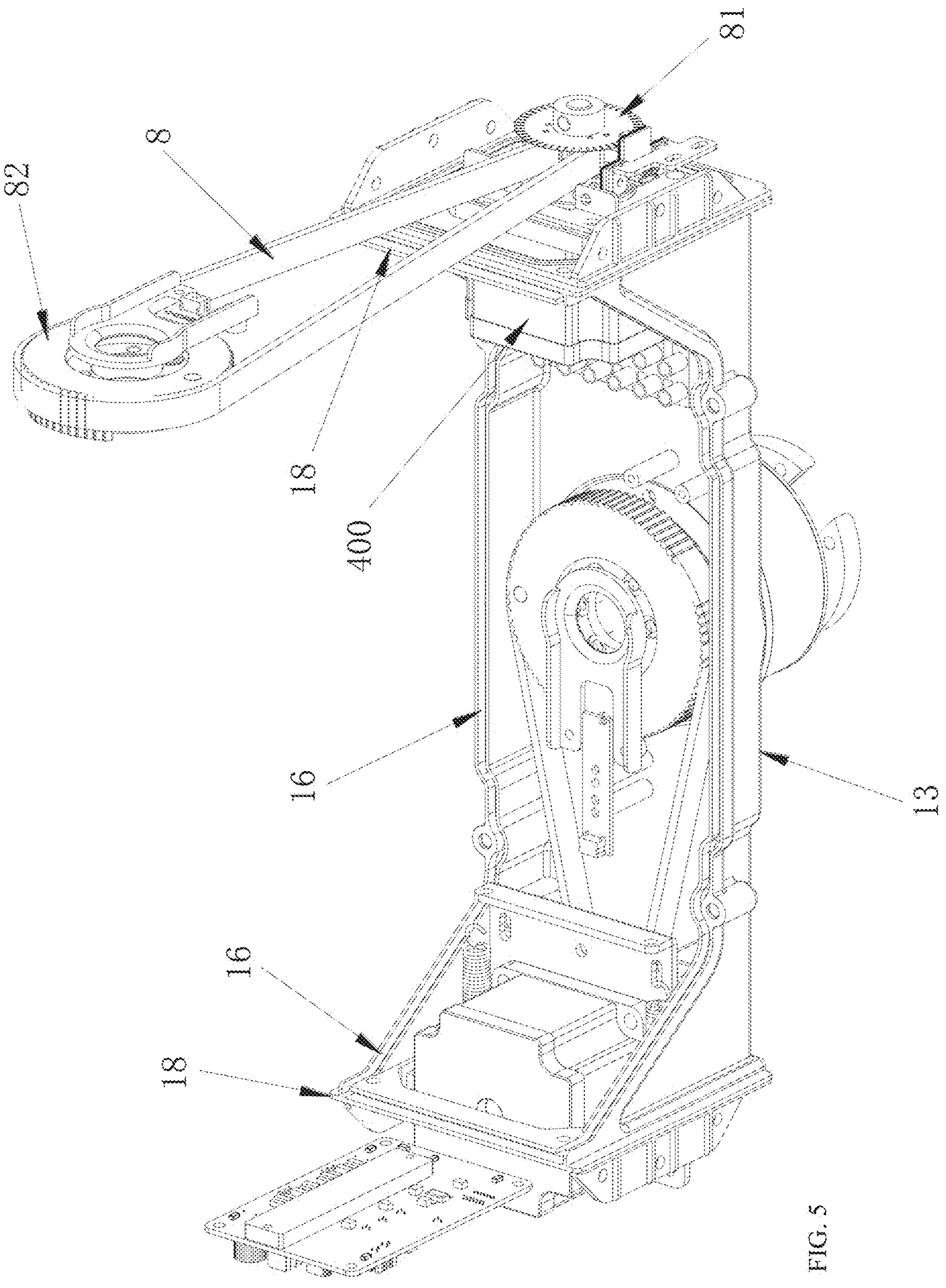
FIG. 5 is another partial view of a detail of FIG. 3.

With reference back to FIG. 5, the motor 400 is preferably mounted in the base sealing cavity 3, and a driving belt 8 is provided in the arm sealing cavity 4. The upper end and bottom end of the driving belt 8 are respectively in transmission connection with a driving wheel 81 and a driven wheel 82. The driven wheel 82 at the upper end is pivoted to the light head. The output shaft 401 of the motor 400 is extended to the arm sealing cavity 4 and coaxially connected with the driving wheel 81. With such configuration, the motor 400 thus can arrange in the support 100 in a sealed way and achieve rotation control for the light head 300, which reduces occupied space in the light head 300.

In order to further reduce occupied space in the light head 300, some components of the stage light fixture, such as the fixed circuit board and magnetic sensors, are also installed in the base sealing cavity 3.

Figure 9:
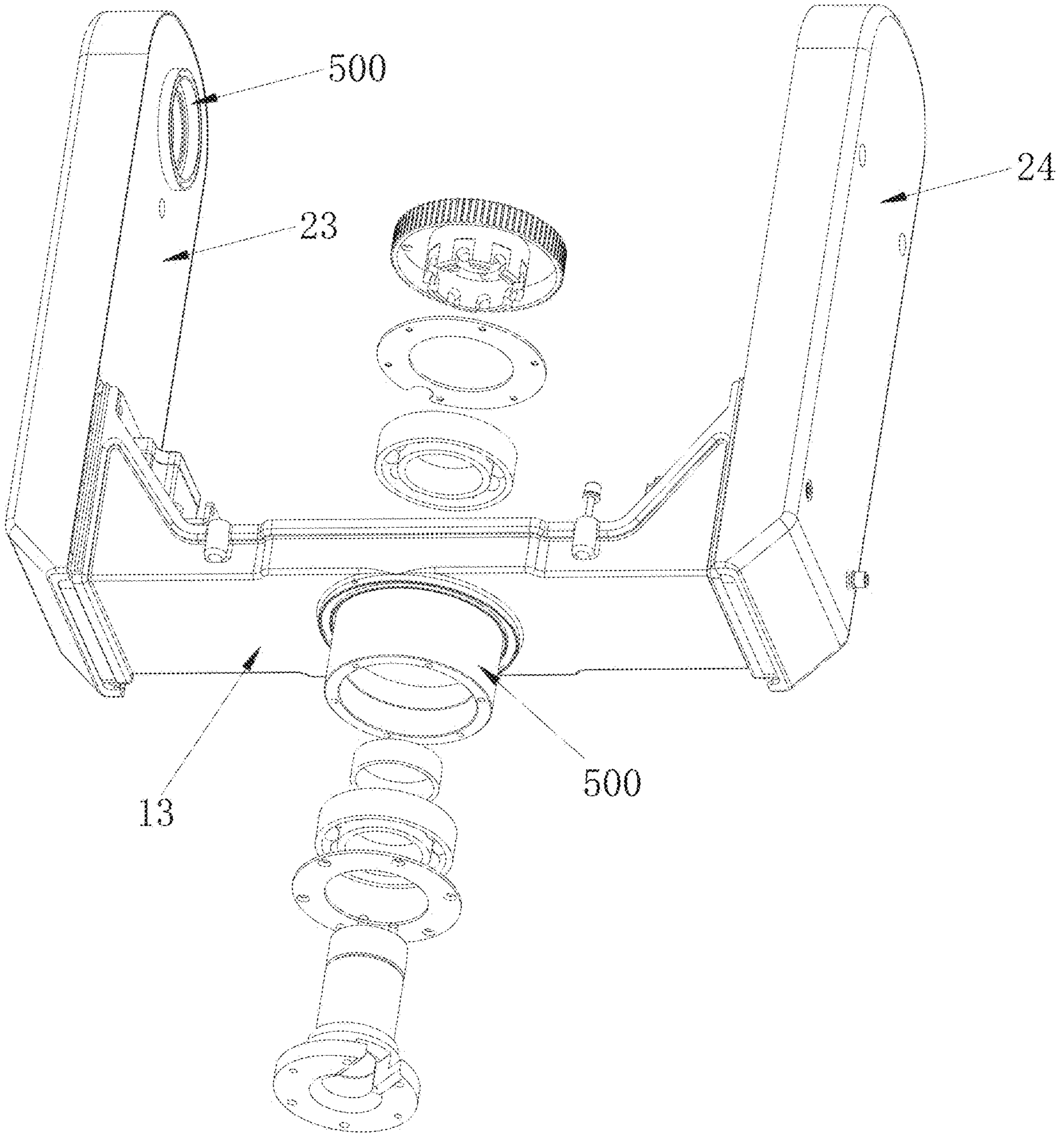
FIG. 9 is a perspective view of a support of the stage light fixture, with a rotation bushing integrally formed.

Referring now to FIG. 9, the support 100 further includes a rotation bushing 500 in rotational connection with the light head 300 and/or the bottom case 200. The rotation bushing 500 is advantageous for cooperation of the elements in relative rotational connection, thereby enhancing structure strength of the rotational connection.

The rotation bushing 500 can be integrally formed with the support base 1 and/or the support arm 2.

Particularly, the rotation bushing 500 in in rotational connection with the bottom case 200 is integrally die-molded with the base bottom plate 13, as integrally die-molded processing can improve accuracy of the formed parts and with less molds.

Obviously, the above-mentioned embodiments of the present invention are only examples for clearly illustrating the present invention, rather than limiting the mode of implementation of the present invention. For those of ordinary skill in the art, changes or alterations in other different forms can also be made on the basis of the above description. It is not needed and also not possible to list all the modes of implementation here. Any modification, equivalent replacement, improvement, etc. made within the spirit and principle of the present invention shall be included within the protection scope of the claims of the present invention.

What is claimed is:

1. A stage light fixture, having a support, a bottom case, a light head rotatable relative to the support or the bottom case with driving of a motor, wherein the support comprises:

a support base pivoted to the bottom case, a base sealing cavity being formed in the support base; and two support arms respectively pivoted to two opposite sides of the light head, two arm sealing cavities being respectively formed in the two support arms, wherein the base sealing cavity is in communication with at least one of the two arm sealing cavities in the two support arms, the support base is in sealed connection with the two support arms at points where the base sealing cavity is in communication with the at least one of the two arm sealing cavities, and the motor is positioned in the base sealing cavity or the arm sealing cavities;

wherein each of the two support arms is provided with an arm interface in communication with the respective arm sealing cavity and the support base is provided with a base interface in communication with the base sealing cavity, the arm interface being abutted against the base interface, an interface sealing ring surrounding the arm interface and the base interface is sandwiched between the support base and the respective support arm, with two opposite sides of the interface sealing ring pressed therebetween.

2. The stage light fixture according to claim 1, wherein each of the two support arms is integrally formed with an annular interface protrusion which surrounds the arm interface and protrudes along a center axis direction of the interface sealing ring, the support base is integrally formed with an interface groove surrounding the base interface for receiving the interface sealing ring, and the annular interface protrusion is inserted in the interface groove and pressed against the interface sealing ring.

3. The stage light fixture according to claim 1, wherein each of the two support arms comprises an arm side plate and an arm cover which are spliced each other in a sealing way, with the arm sealing cavity formed in a spliced space therebetween, and the arm interface is provided in the arm side plate.

4. The stage light fixture according to claim 3, wherein the arm cover and the arm side plate are integrally formed with an annular arm cover protrusion surrounding the respective arm sealing cavity and a side plate groove, respectively, an arm sealing ring is received in the side plate groove, and the annular arm cover protrusion is inserted in the side plate groove and pressed against the arm sealing ring.

5. The stage light fixture according to claim 3, wherein two opposite sides of each arm side plate are respectively formed with a clamping groove and two opposite sides of the support base are respectively formed with a clamping plate, the clamping plate is cooperatively inserted in the corresponding clamping groove at two opposite sides of each arm side plate to clamp the corresponding arm side plate.

6. The stage light fixture according to claim 1, wherein the support base comprises a base bottom plate and a base cover, which are spliced each other in a sealing way, with the base sealing cavity formed in a spliced space therebetween.

7. The stage light fixture according to claim 6, wherein the base bottom plate is integrally formed with a reinforced frame protruding towards a top of the base cover, the base interface is provided in the reinforced frame, and a top of the reinforced frame is spliced with an inner wall of the top of the base cover when the base bottom plate and the base cover are spliced together.

8. The stage light fixture according to claim 7, wherein the base cover and the base bottom plate are integrally formed with an annular base cover protrusion and a bottom plate groove, respectively, with a surrounding track of the bottom plate groove spanning the top of the reinforced frame, a base sealing ring is received in the bottom plate groove, and the annular base cover protrusion is inserted in the bottom plate groove and pressed against the base sealing ring.

9. The stage light fixture according to claim 7, wherein an inner wall of the top of the base cover is integrally formed with a locking connection plate extending along a direction perpendicular to a central axis of the interface sealing ring, the top of the reinforced frame is formed with a locking connection groove corresponding to the locking connection plate, and the locking connection plate is inserted in the locking connection groove and cooperatively locked therein.

10. The stage light fixture according to claim 3, wherein the arm side plate is a die-molded metal part and the arm cover is a plastic part.

11. The stage light fixture according to claim 6, wherein the base bottom plate is a die-molded metal part and the base cover is a plastic part.

12. The stage light fixture according to claim 1, wherein the support further comprises a rotation bushing in rotational connection with at least one of the light head and the bottom case.

13. The stage light fixture according to claim 12, wherein the rotation bushing is integrally formed with at least one of the support base and the support arm.

* * * * *